United States Patent [19]

Dexter et al.

[11] 3,905,939
[45] Sept. 16, 1975

[54] 3,5-DIALKYL-4-HYDROXYPHENYL DERIVATIVES OF TRIAZINES

[75] Inventors: Martin Dexter, Briarcliff Manor; Martin Knell, Ossining, both of N.Y.

[73] Assignee: Ciba-Geigy Corporation, Ardsley, N.Y.

[22] Filed: Oct. 10, 1972

[21] Appl. No.: 296,446

Related U.S. Application Data

[62] Division of Ser. No. 135,461, April 19, 1971, Pat. No. 3,706,740.

[52] U.S. Cl........ 260/45.8 N; 252/403; 260/248 CS; 426/182; 426/197; 426/228; 426/328; 252/402
[51] Int. Cl............................ B01j 1/16; C07d 55/50
[58] Field of Search....... 252/403, 402; 260/248 CS, 260/45.8 N; 426/182, 197, 328, 228, 227

[56] References Cited
UNITED STATES PATENTS 3,244,708  4/1966  Duennenbarger et al. ... 260/248 CS
3,567,724  3/1971  Beears........................... 260/248 CS

FOREIGN PATENTS OR APPLICATIONS 614,726  6/1962  Belgium ........................ 260/248 CS Primary Examiner—Benjamin R. Padgett
Assistant Examiner—Irwin Gluck
Attorney, Agent, or Firm—Vincent J. Cavalieri; Charles W. Vanecek

[57] ABSTRACT

Novel dialkyl-4-hydroxyphenyl derivatives of triazine were prepared which are stabilizers of organic material. Certain of these compounds can be prepared by direct alkylation of 2,6-dialkylphenol with cyanuric chloride or through the cyclization of the appropriate 3,5-dialkyl-4-hydroxyphenyl alkylimino ester hydrochloride. A typical embodiment of this invention is 2,4,6-tris(3',5'-dimethyl-4'-hydroxypheyl-1,3,5-triazine. The compounds of this invention are useful as stabilizers of organic material which are subject to oxidative and thermal deterioration.

11 Claims, No Drawings

3,5-DIALKYL-4-HYDROXYPHENYL DERIVATIVES OF TRIAZINES

This is a Division of copending application Ser. No. 135,461, filed Apr. 19, 1971, now U.S. Pat. No. 3,706,740.

DETAILED DESCRIPTION

This invention relates to novel dialkyl-4-hydroxyphenyl derivatives of triazine which are useful as stabilizers for organic materials which are subject to thermal and oxidative deterioration. The compounds of this invention are represented by the formula

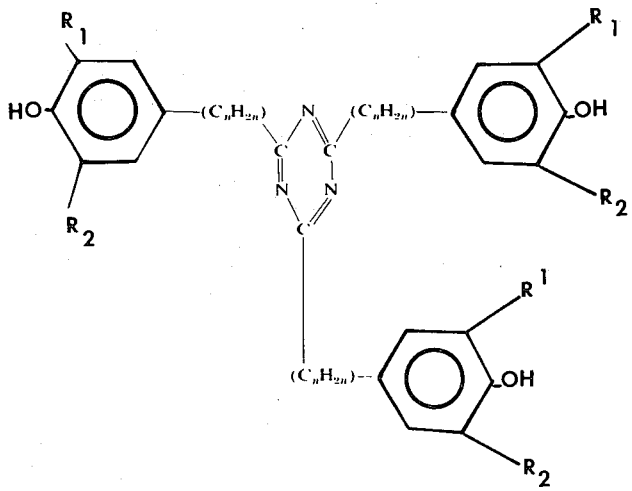

wherein
each of $R_1$ and $R_2$ is a (lower) alkyl group of from 1 to 6 carbon atoms; and
$n$ has a value of 0, 1 or 2.

Illustrative examples of (lower) alkyl groups which are represented by $R_1$ and $R_2$ are methyl, ethyl, propyl, isopropyl, butyl, t-butyl, t-amyl, hexyl and the like. The preferred groups are t-butyl and methyl.

The dialkyl-4-Hydroxyphenyl derivatives of triazine are useful as stabilizers of organic materials normally subject to oxidative and thermal deterioration. Such organic materials include: synthetic organic polymeric substances such as vinyl resins formed from the polymerization of vinyl halides or from the copolymerization of vinyl halides with vinylesters and unsaturated hydrocarbons such as butadienes and styrene; poly-α-olefins such as polyethylene, polypropylene, polybutylene, polyisoprene, polybutadiene, and the like, including copolymers of poly-α-olefins; polyurethanes and polyamides such as polyhexamethylene adipamide and polycaprolactam; polyesters such as polyethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene.

Other materials which can be stabilized by the compounds of the present invention include lubricating oil of the aliphatic ester type, i.e., di(2-ethylhexyl)azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins, and the like, salts of fatty acids such as soaps and the like.

In general, one or more of the stabilizers of the present invention are employed in amounts, in toto, of from about 0.005 to about 5% by weight of the composition to be stabilized. A particularly advantageous range of the present stabilizers is from about 0.05 to about 2%. The preferred range is particularly effective in polyolefins such as polypropylene.

These compounds may be incorporated in the polymer substance during the usual processing operations, for example, by hot-milling, the composition then being extruded, pressed, roll-molded or the like into films, fibers, filaments, hollowspheres and the like. The heat stabilizing properties of these compounds advantageously stabilize the polymer against degradation during such processing at the high temperatures generally encountered.

The stabilizers employed in this invention can be also used in combination with other stabilizers or additives. Especially useful co-stabilizers are dilauryl-β-thiodipropionate and distearyl-β-thiodipropionate.

The following formula represents co-stabilizers which are in certain instances very useful in combination with the stabilizers of this invention:

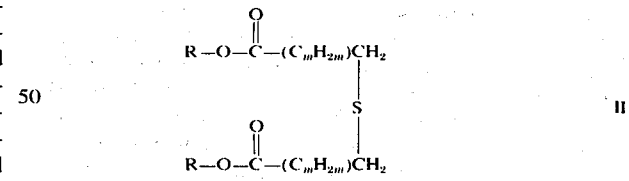

wherein R is an alkyl group having from 6 to 24 carbon atoms; and $m$ is an integer from 1 to 6. The above co-stabilizers are used in the amount of from 0.01 to 2% by weight of the organic material, and preferably from 0.1 to 1%.

Other antioxidants, antiozonants, thermal stabilizers, ultraviolet light absorbers, coloring materials, dyes, pigments, metal chelating agents, etc., may also be used in the compositions in combination with the stabilizers of the invention.

The compounds of this invention wherein n of formula I is 0 are prepared by reacting cyanuric chloride in an nonaqueous aprotic solvent such as tetrachlorethane with 2,6-dialkylphenol having the formula

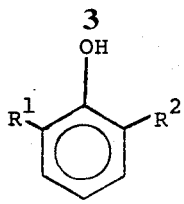

III wherein R¹ and R² are as previously defined, said reaction being carried out at room temperature and catalyzed with aluminum chloride.

The compounds of this invention wherein $n$ of formula I is 1 or greater, are prepared by first forming a dialkyl-4-hydroxyphenyl alkyliminoester hydrochloride by reacting methanol and HCl in an inert solvent with a 3,5-dialkyl-4-hydroxyphenylalkyl nitrile derivative of the formula

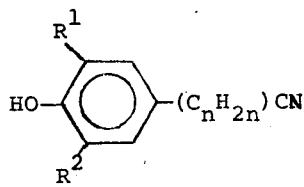

IV wherein R¹, R² and $n$ are previously defined. The dialkyl-4-hydroxyphenyl alkyliminoester hydrochloride thus formed is then cyclized by treating said compound with sodium acetate in ethyl alcohol.

The following examples, presented for illustration and not limitation, will serve to typify further the nature of the present invention.

EXAMPLE 1

2,4,6-tris(3',5'-dimethyl-4'-hydroxyphenyl)-1,3,5-triazine

A mixture of 18.5 g of cyanuric chloride and 40 g of aluminum chloride in 700 g of tetrachloroethylene were stirred for 40 minutes at room temperature. To this mixture was added 73 g of 2,6-dimethylphenol. The reaction continued with stirring at room temperature for an additional 93 hours. The crude reaction product was separated by filtration and washed with 1,000 g of 1 Normal HCl. Purification was accomplished by recrystallization from 100 g of hot dimethylformamide. The recrystallized product had a melting point of 311° to 315°C. The pure product showed only one spot by TLC analysis and had the expected NMR spectrum.

By following essentially the same procedure, 2,4,6-tris (3',5'-di-t-butyl-4'-hydroxyphenyl)-1,3,5-triazine is prepared by substituting 2,6-dimethylphenol with an equivalent amount of 2,6-di-t-butylphenol.

EXAMPLE 2

2,4,6-tris[2'-(3'',5''-di-t-butyl-4''-hydroxyphenyl)-ethyl]-1,3,5-triazine

To 150 ml of benzene was added 21.95 g of 3,5-di-t-butyl-4-hydroxyphenylproprionitrile, and 4 ml of methanol. The reaction was cooled to about 0°C and HCl was bubbled through the reaction mixture for 1 hour. The reaction was allowed to stir at 0° to 5°C for serveral hours followed by refluxing for 16 hours. The product was filtered and vacuum dried over KOH to yield the corresponding iminoester hydrochloride.

To 16.47 g of the iminoester hydrochloride thus formed was added 4.16 g of sodium acetate and 20 ml of methanol. The mixture was allowed to react for approximately 16 hours at room temperature. 50 ml of water was added to the reaction mixture after which the alcohol was removed by heating on a steam-bath. A water benzene mixture was added to the resulting slurry and after an ether extraction, the organic layer was concentrated on a steam-bath till incipient crystallization occured. The product thus obtained was recrystallized twice from acetic acid and had melting point of 208.5° to 209.5°C.

By substituting an equivalent amount of 3,5-di-t-butyl-4-hydroxyphenylacetonitrile for 3,5-di-t-butyl-4-hydroxyphenylpropionitrile in the above procedure, the corresponding 2,4,6-tris (3', 5'-di-t-butyl-4'-hydroxybenzyl)-1,3,5-triazine is obtained which has a melting point of 160°C.

In a similar manner, by substituting an equivalent amount of 3,5-dimethyl-4-hydroxyphenyl-acetonitrile for 3,5-di-t-butyl-4-hydroxyphenylpropionitrile in the above procedure the corresponding 2,4,6-tris(3',5'-dimethyl-4'-hydroxybenzyl)-1,3,5-triazine is obtained which has a melting point of 208°C.

EXAMPLE 3

A batch of unstabilized polypropylene powder (Hercules Profax 6501) was thoroughly blended with 0.5% by weight of various compounds of this invention. The blended materials were then milled on a two-roll mill at 182°C, for 10 minutes, after which time the stabilized polypropylene was sheeted from the mill and allowed to cool.

The milled polypropylene sheets were then cut into pieces and pressed for 7 minutess on a hydraulic press at 218°C, 2,000 pounds per square inch pressure. The resulting sheet of 25 mil thickness were tested for resistence to accelarated aging in a forced draft oven at 150°C. The results are set out in Table I below:

TABLE I

| Additive(s) | Oven Aging at 150°C Hours to Failure |
|---|---|
| 0.5% of 2,4,6-tris(3', 5'-dimethyl-4'-hydroxyphenyl)-1,3,5-triazine | 15 |
| 0.1% of 2,4,6-tris(3', 5'-dimethyl-4'-hydroxyphenyl)-1,3,5-triazine + 0.5% DLTDP* | 1028 |
| 0.5% of 2,4,6-tris[2'-(3'',5''-di-t-butyl-4''-hydroxyphenyl)ethyl]-1,3,5-triazine | 1120 |
| 0.1% of 2,4,6-tris[2'-(3'',5''-di-t-butyl-4''-hydroxyphenyl)ethyl]-1,3,5-triazine + 0.5% DLTDP* | 955 |
| 0.5% of DLTDP* | 300 |
| Unstabilized Polypropylene | 3 |

*dilaurylthiodipropionate (a synergist for phenolic antioxidants)

The above data clearly indicates the significant increase in the stabilization of polypropylene upon addition of the antioxidants of the present invention.

EXAMPLE 4

To 39.3 g (0.15 moles) of hexamethylene diammonium adipate is added 0.177 g (7.5 × 10⁻⁴mole; 0.5 mole percent) of hexamethylene diammonium diacetate as molecular weight control agent, and 0.183 g (0.5% of theoretical nylon yield) of 2,4,6-tris(3',5'-dimethyl-4'-hydroxyphenyl)-1,3,5-triazine. The mixture is blended thoroughly and added to a Pyrex polymer tube.

The polymer tube is evacuated three times and each time filled with high purity nitrogen. The polymer tube with the continuously maintained, slightly positive nitrogen pressure, is placed in a methyl salicylate vapor bath at 220°C. After 1 hour at 222°C the polymer tube is transferred to an o-phenyl-phenol bath at 285°C for 1 hour. The polymer tube is kept in the 285°C vapor bath for an additional one half hour while it is maintained under vacuum of less than 1 mm pressure. High purity nitrogen is then readmitted and the polymer tube is allowed to cool.

The nylon-6,6 obtained is ground in a mill at ambient temperature of 25°C. About 2 g are heated in a small glass Petri dish in a circulating air-rotary oven at 140°C for 65 hours. The viscosity of a 1% sulfuric acid solution of aged and unaged polymer samples are determined at 25°C. Stabilizer effectiveness is judged by the percent retention of specific viscosity, color-formation, and weight retention after oven aging. The stabilized polyamide has better viscosity, color retention and substantially less weight loss than a polyamide which is unstabilized after oven aging.

Stabilized polyamide compositions are prepared in a similar manner as above with the following stabilizers:
  a. 0.5% of 2,4,6-tris(3',5'-di-t-butyl-4'-hydroxyphenyl)-1,3,5-triazine
  b. 0.5% of 2,4,6-tris[2'-(3'',5''-di-t-butyl-4''-hydroxyphenyl)ethyl]-1,3,5-triazine Substantially similar results are obtained when 0.5% of the aforementioned stabilizers are incorporated into nylon-6,6 flakes before extrusion.

EXAMPLE 5

A quantity of SBR emulsion containing 100 g of rubber (500 ml of 20% SBR obtained from Texas U.S., Synpol 1500 ) previously stored under nitrogen, is placed in a beaker and stirred vigorously. The pH of the emulsion is adjusted to 10.5 with a 0.5N NaOH solution.

To the emulsion is added 50 ml of 25% NaCl solution. A 6% NaCl solution of pH 1.5 is added in a thin stream with virorous stirring. When pH 6.5 is reached, the rubber begins to coagulate and the addition is slowed down in order to maintain uniform agitation. The addition of the acidic 6% NaCl solution is terminated when a pH 3.5 is reached. The coagulated crumb-rubber slurry at pH 3.5 is stirred for one half hour.

The coagulated rubber is isolated by filtration through cheese cloth, and rinsed with distilled water. After three subsequent washing with fresh distilled water, the coagulated rubber is dried, first at 25 mm Hg and finally to constant weight under high vacuum (<1 mm.) at 40°-45°C.

The dried rubber (25 g) is heated under nitrogen at 125°C in a Brabender mixer and to this is added with mixing 1.25 g (0.5%) of 2,4,6-tris[2'-(3'',5''-di-t-butyl-4''-hydroxyphenyl)ethyl]-1,3,5-triazine. The composition is mixed for 5 minutes after which it is cooled and compression molded at 125°C into 5 × 5 × 0.025 plaques.

The plaques are placed on aluminum sheets and heated in a circulating air oven at 100°C for up to 96 hours. The viscosity of a 0.5% toluene solution of aged and unaged rubber samples are determined at 25°C. Stabilizer effectiveness is judged by the percent retention of specific viscosity, than formation and gel content after oven aging. The stabilized rubber has better viscosity, color retention and less gel content that the rubber which is unstabilized after oven aging.

Similar results are obtained when 2,4,6-tris(3',5'-di-t-butyl-4'-hydroxybenzyl)-1,3,5-triazine is used in place of the above mentioned stabilizer in the rubber composition.

EXAMPLE 6

High impact polystyrene resin containing elastomer (i.e., butadiene-styrene) is stabilized against loss of elongation properties by incorporation of 0.5% by weight of 2,4,6-tris(3',5'-dimethyl-4'-hydroxyphenyl)-1,3,5-triazine. Under the test conditions described below, the stabilized resin retains a higher percentage of its original elongation properties, whereas the unstabilized resin retains less elongation properties. A substantial improvement in stability is also noted when only 0.05% of the stabilizer is employed.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163°C and a pressure of 2,000 pounds per square inch into a sheet of uniform thickness (25 mil). The sheets are then cut into strips, approximately 4 × 0.5 inches. A portion of these strips is then measured for length of elongation in the Instron Tensile tester (Instron Engineering Corporation, Quincy, Massachusetts). The remaining portion of the strips is aged in a forced draft oven for 6 weeks at 75°C and thereafter tested for elongation.

EXAMPLE 7

Cyclohexene, freshly distilled is stabilized by the addition thereto of 0.01% by weight of 2,4,6-tris[2'-(3'',-5''-di-t-butyl-4''-hydroxyphenyl)ethyl]-1,3,5-triazine. The effectiveness of this stabilizer in cyclohexene is tested by the ASTM )525-55 oxidation test. The unstabilized cyclohexene fails in shorter time as compared to the stabilized cyclohexene.

EXAMPLE 8

A stabilized mineral oil composition is prepared by incorporating into a refined mineral oil of 183 S.U.S., at 100°F., (Regal Oil B. Texas Company) 0.005% by weight of 2,4,6-tris(3',5'-di-t-butyl-4'-hydroxyphenyl)-1,3,5-triazine.

EXAMPLE 9

A stabilized high temperature lubricating oil is prepared by incorporating 2% by weight of 2,4,6-tris(3',-5'-dimethyl-4'-hydroxyphenyl)-1,3,5-triazine to the lubricant, which comprises diisoamyladipate. The stabilized composition is compared with the unstabilized lubricant by heating at 175°in the presence of air and metallic catalysts according to the test method described in Military Specification Mil-I-7808c. After 72 hours, the blank containing no stabilizer contains more sludge and has a greater viscosity than the stabilized lubricant.

EXAMPLE 10

A composition is prepared comprising linear polyethylene and 1.0% by weight of 2,4,6-tris[2'-(3'',5''-di-t-butyl-4'''-hydroxyphenyl)ethyl]-1,3,5-triazine. The composition is injected molded into tensile bars which are placed in a circulating air oven at 120°C. In contrast to those molded from unstabilized linear polyethylene, tensile bars molded from the instant composition retained its tensile strength for a substantially longer period.

EXAMPLE 11

A composition comprising an acrylonitrile butadienestyrene terpolymer and 0.1% of 2,4,6-tris(3″,5″-dimethyl-4″-hydroxyphenyl)-1,3,5-triazine resists discoloration at 120°C longer than one which does not contain the stabilizer.

EXAMPLE 12

To 50 g of polyacetal resin containing an acid scavenger dicyandiamide was added 0.25 g of 2,4,6-tris[2′-(3″, 5″-di-t-butyl-4″-hydroxyphenyl)ethyl]-1,3,5-triazine. The resin containing this additive was milled for 7 minutes at 200°C in a Brabender Plasti-recorder. The milled formulation was subsequently pressed into a 40 mill sheet at 215°at 350°psi for 90 seconds then cooled quickly in a cold press at 350°psi. The stabilized sheets were then remolded for 2 minutes at compact pressure and for 3 minutes at 300°psi at 215°C to give plaques 1½ × 2¼ inches × 125 mil. The resulting plaques were tested for resistance to accelerated aging in a force draft oven at 140°C. Unstabilized samples of polyacetal containing only dicyandiamide were tested in the same manner and the results compared in Table II below.

TABLE II

| Additive(s) | % Wt. loss at 140°C | |
|---|---|---|
| | 210 hrs | 446 hrs |
| 0.2% of 2,4,6-tris[2′-(3″,5″-di-t-butyl-4-hydroxyphenyl)ethyl]-1,3,5-triazine | 1.72 | 5.22 |
| No additive | 5.58 | — |

The data clearly shows the significant increase in the stabilization of the polyacetal upon addition of the antioxidant of the present invention.

EXAMPLE 13

A batch of unstabilized nylon, 6 (Perlon polyamide, containing 0.1% $TiO_2$) was thoroughly blended with 0.5% by weight of various compounds of this invention. The blended materials were melt blended under a nitrogen atmosphere at 270°C to insure uniform distribution of the antioxidant after cooling. The samples were pressed at 260°C into films of thickness of 0.3 mm. The films were aged in a forced draft oven at 165°C for up to 72 hours. The relative viscosity (1% solution in $H_2SO_4$ at 30°C) was measured periodically as indicated in the table below.

The data clearly shows the significant increase in the stabilization of nylon, 6 upon the addition of the compounds of the present invention.

What is claimed is:

1. A composition of matter stabilized against oxidative deterioration which comprises an organic material normally subject to oxidative deterioration containing from 0.005 to 5% by weight of a stabilizing compound of the formula

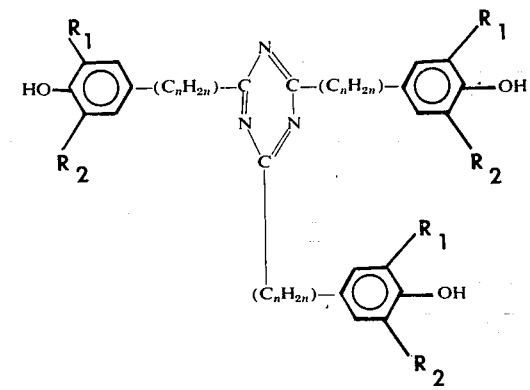

wherein
each of $R_1$ and $R_2$ is a (lower)alkyl group of from 1 to 6 carbon atoms; and
$n$ has a value of 0, 1 or 2.

2. A composition of claim 1 wherein each of $R_1$ and $R_2$ is methyl or tert butyl.

3. A composition of claim 2 wherein the stabilizer is 2,4,6-tris-(3′,5′-dimethyl-4′-hydroxyphenyl)1,3,5-triazine.

4. A composition of claim 2 wherein the stabilizer is 2,4,6-tris-[2′-(3″,5″-di-t-butyl-4″-hydroxyphenyl) ethyl]-1,3,5-triazine.

5. A composition of claim 2 wherein the stabilizer is 2,4,6-tris-(3′,5′-di-t-butyl-4′-hydroxybenzyl)-1,3,5-triazine.

6. A composition of claim 2 wherein the stabilizer is 2,4,6-tris-(3′,5′-dimethyl-4′-hydroxybenzyl)-1,3,5-triazine.

7. A composition of claim 2 containing a co-stabilizer having the formula

TABLE III

| Antioxidant | Relative Viscosity after Aging | |
|---|---|---|
| | 24 hrs. | 72 hrs. |
| 2,4,6-tris (3′, 5′-di-t-butyl-4′-hydroxybenzyl)-1,3,5-triazine | 1.95 | 1.65 |
| 2,4,6-tris-[2′(3″,5″-di-t-butyl-4″-hydroxyphenyl)ethyl]-1,3,5-triazine | 2.02 | 1.73 |
| Unstabilized | 1.50 | 1.35 |

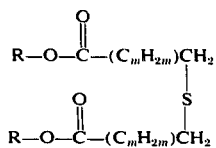

wherein

R is alkyl of 6 to 24 carbon atoms; and

*m* is an integer from 1 to 6.

8. A composition of claim 2 wherein the organic material is a member selected from polyolefin, polyamide, and polyacetal containing an acid scavenger.

9. A composition of claim 7 wherein the organic material is polyolefin.

10. A composition of claim 9 wherein the polyolefin is polypropylene.

11. A composition of claim 10 wherein the co-stabilizer is dilaurylthiodipropionate.

* * * * *